(12) United States Patent
Mendonca

(10) Patent No.: US 8,250,630 B2
(45) Date of Patent: Aug. 21, 2012

(54) DETECTING UNAUTHORIZED COMPUTER ACCESS

(75) Inventor: Eduardo Mendonca, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 679 days.

(21) Appl. No.: 12/398,823

(22) Filed: Mar. 5, 2009

(65) Prior Publication Data

US 2010/0229219 A1 Sep. 9, 2010

(51) Int. Cl.
*G06F 7/04* (2006.01)
*G06F 12/14* (2006.01)

(52) U.S. Cl. ............. 726/4; 726/17; 713/165; 380/277

(58) Field of Classification Search ........ 726/4; 713/165; 380/277; 705/26
See application file for complete search history.

(56) References Cited

U.S. PATENT DOCUMENTS

| | | | | |
|---|---|---|---|---|
| 6,327,707 B1* | 12/2001 | McKeeth et al. | ............. | 717/174 |
| 6,557,102 B1* | 4/2003 | Wong et al. | ............. | 713/176 |
| 7,093,125 B2* | 8/2006 | Robb et al. | ............. | 713/166 |
| 7,428,306 B2* | 9/2008 | Celikkan et al. | ............. | 380/28 |
| 7,818,557 B2* | 10/2010 | Bestmann | ............. | 713/2 |
| 8,005,959 B2* | 8/2011 | Bernardi et al. | ............. | 709/227 |
| 2008/0208639 A1* | 8/2008 | Pattison | ............. | 705/4 |
| 2009/0138703 A1* | 5/2009 | Schneider | ............. | 713/155 |
| 2009/0240943 A1* | 9/2009 | Brown et al. | ............. | 713/171 |
| 2010/0299217 A1* | 11/2010 | Hui | ............. | 705/23 |
| 2011/0083163 A1* | 4/2011 | Auvenshine et al. | ............. | 726/4 |

OTHER PUBLICATIONS

Mark Joseph Edwards, Display Legal Notices at Logon, May 2005, http://web.archive.org/web/20050504164724/http://www.krzywanek.de/tips/nt1000-nt1050/nt1001.htm.*

* cited by examiner

*Primary Examiner* — Kaveh Abrishamkar
(74) *Attorney, Agent, or Firm* — Hickman Palermo Truong Becker Bingham Wong LLP

(57) ABSTRACT

A machine executed method comprising at a first computer, receiving from a second computer a request to gain root-administrator access to an operating system (OS) of the first computer; the first computer, in response to receiving the request to gain root-administrator access, granting the root-administrator access and modifying stored access state data from a first state associated with the OS to a second state associated with the OS, wherein the second state is different than the first state and the second state indicates that root-administrator access to the OS was granted.

22 Claims, 5 Drawing Sheets

DETECTING UNAUTHORIZED COMPUTER ACCESS

TECHNICAL FIELD

The present disclosure relates to access of computer users to sensitive computer features, such as operating system root access.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer products or appliances which include a combination of hardware and software elements, generally execute software applications logically on top of an operating system that is loaded on computer hardware or within a virtual machine. In many cases, different levels of operating system access are available. For example, an interface such as a web user interface or a command line interface (CLI) may provide limited access that protects one or more files from modification or access. The appliance, used in a limited access state, may be warranted against problems and may be supported by a support entity such as a manufacturer of the appliance. Alternatively, an interface may provide root shell or a full operating system shell which provides access to files that cannot be accessed with a limited shell.

When a problem occurs with an appliance, generally the limited shell can be used to debug the problem. However, some problems may require root access. Therefore, when a consumer contacts a support entity for debugging an appliance, the support entity may provide the consumer with root access for a limited time period to facilitate fixing the problem, but may wish to prevent access after the limited time period has ended. For example, the consumer may be informed how to download a root patch for the appliance. Root access is not provided indefinitely because, for example, modifications with root access may create problems not intended to be supported by the support entity.

However, during the limited time period of root access provided to the consumer, the consumer may create additional back door root access routes and use the back door root access routes after expiration of the limited time period for root access allowed by the support entity. Further, with operating systems such as Linux, once a user has gained full Linux shell access, the user can create a root-shell back-door, then install and run software on the computer that the computer was never intended to support. The user may be able to change kernel parameters, database parameters, and other configuration values that were never intended to be covered by a support agreement.

One approach might be to generate a hash value based on a binary image of an operating system and applications in memory of an appliance or computer. However, this approach is too time-consuming when the binary image is large. For example, some appliances may have images that are 250 Gb or more in size, and generating a hash value based on such a large image is expected to take too long to provide for practical verification at the time of a support call.

DETAILED DESCRIPTION

Figure 1:
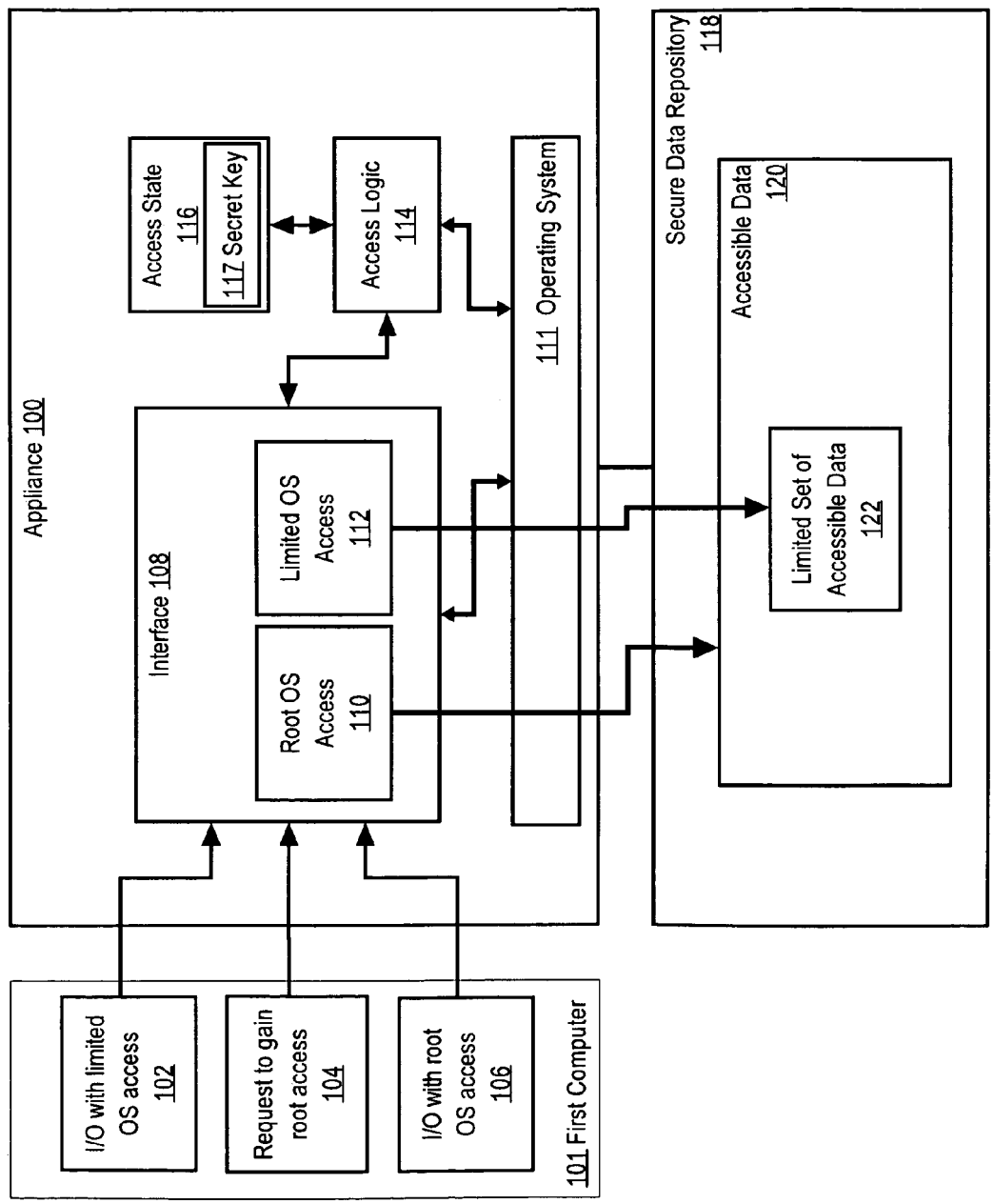
FIG. 1 illustrates computers and a data repository that can be used in detecting unauthorized access to a computer.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Embodiments are described in sections according to the following outline:

1.0 General Overview
    2.0 Structural & Functional Overview
    2.1 Example Computer Configuration
    2.2 Access State Data and Secret Key(s)
    2.3 Determining Secret Key Using Challenge
    2.4 Providing Access After Warning
    2.5 Supporting Features and Options
    3.0 Detecting and Controlling Access
    3.1 Processing Requests for Root-Administrator Access
    3.2 Changes in Appliance State—Single Key
    3.3 Changes in Appliance State—Multiple Key(s)
    4.0 Implementation Mechanisms—Hardware Overview
    5.0 Extensions and Alternatives
    1.0 General Overview In an embodiment, a machine executed method comprising at a first computer, receiving from a second computer a request to gain root-administrator access to an operating system (OS) of the first computer; the first computer, in response to receiving the request to gain root-administrator access, granting the root-administrator access and modifying stored access state data from a first state associated with the OS to a second state associated with the OS, and the second state is different than the first state and the second state indicates that root-administrator access to the OS was granted.

In an embodiment, the second state is associated with a lesser amount of technical support services than the first state. In an embodiment, the state data originally comprises a secret key value, and wherein modifying the state data comprises deleting the secret key value.

In an embodiment, the state data originally comprises a secret key value, and further comprising the first computer generating and displaying a warranty verification number on a display device that is coupled to the first computer, wherein the generating comprises one-way hash logic in the first computer processing at least the secret key, a current time, and a serial number associated with the first computer.

In an embodiment, the state data originally comprises a secret key value, and further comprising the first computer receiving a challenge value, and generating and displaying a warranty verification number on a display device that is coupled to the first computer, wherein the generating comprises one-way hash logic in the first computer processing at least the secret key, the challenge value, and a serial number associated with the first computer.

In an embodiment, the method comprises re-imaging the OS and changing the stored state value to the first state associated with the OS. In an embodiment, the method further comprises, in response to receiving the request to gain root-administrator access, displaying on a display device coupled to the first computer, a warning message indicating that gaining root-administrator access will reduce support for the OS, and receiving user input indicating confirmation to accept reduced support and gain root-administrator access.

In an embodiment, the state data comprises a secret key value, and further comprising generating a first warranty verification number for the first computer based on the secret key value, and the first warranty verification number is valid for a specified time after the generating; in response to receiving the request to gain root-administrator access to the operating system (OS), deleting the secret key value and granting the root-administrator access of the OS.

In an embodiment, the state data comprises at least a first secret key value and a second secret key value, and the method further comprises the first computer, in response to receiving the request to gain root-administrator access, granting the root-administrator access, deleting the first secret key value, and modifying stored state data from a first state associated with the OS to a third state associated with the OS, wherein the third state is different than the first state and the third state indicates that root-administrator access to the OS was granted; the first computer receiving a second request to gain root-administrator access; the first computer, in response to receiving the second request to gain root-administrator access, granting the root-administrator access, deleting the second secret key value, and modifying stored state data from a first state associated with the OS to the second state associated with the OS, wherein the second state indicates that root-administrator access to the OS was granted.

In an embodiment, a computer comprises operating system logic comprising a command interface that provides one command configured to process requests to obtain root-administrator shell access, and an encrypted filesystem; access state data stored in the encrypted filesystem; access logic coupled to the operating system logic and coupled to the access state data, wherein the access logic is configured upon execution to cause the computer to perform receiving from a second computer a request to gain root-administrator access to the operating system logic of the first computer, and in response to receiving the request to gain root-administrator access, granting the root-administrator access and modifying stored access state data from a first state associated with the operating system logic to a second state associated with the operating system logic, wherein the second state is different than the first state and the second state indicates that root-administrator access to the operating system logic was granted.

In an embodiment, a method comprises at a first computer, receiving from a second computer a request to gain root-administrator access to an operating system (OS) of the first computer; the first computer, in response to receiving the request to gain root-administrator access, granting the root-administrator access and modifying stored access state data from a first state associated with the OS to a second state associated with the OS, wherein the second state is different than the first state and the second state indicates that root-administrator access to the OS was granted; wherein the state data originally comprises a secret key value; requesting support services; receiving a request to provide a valid warranty verification number in consideration for receiving the support services; the first computer generating and displaying a warranty verification number on a display device that is coupled to the first computer, wherein the generating comprises one-way hash logic in the first computer processing at least the secret key, a current time, and a serial number associated with the first computer; providing the warranty verification number to a support services representative; a third computer associated with the support services generating and displaying a plurality of second warranty verification numbers by one-way hash logic in the third computer processing at least the secret key, a plurality of times that include the current time, and the serial number associated with the first computer; the support services determining whether one of the second warranty verification numbers matches the warranty verification number and providing the support services only when one of the second warranty verification numbers matches.

Although specific components are recited herein as performing the method steps, in other embodiments agents or mechanisms acting on behalf of the specified components may perform the method steps. Further, although the invention is discussed with respect to components distributed over multiple systems, however other embodiments of the invention include systems where all components are on a single system. The techniques described herein do not limit the scope of the invention and further, the techniques described herein may be applicable to other embodiments.

In an embodiment, unauthorized full operating system access can be blocked in effect by implementing a logical warranty seal for the operating system. For example, unauthorized full Linux shell access can be blocked, or reduced support can be provided if a user succeeds in gaining full Linux shell access. A warranty warning message may be displayed as the result of a user issuing a CLI command, such as "show version" or "show tech-support." The user may choose to bypass the warning message and gain root-administrator access to address a problem for which a solution requires root-administrator access, but the result of such an action may be a change in the system state that may affect a support agreement. The user would then have to re-image the appliance to return the state of the appliance to a supported state; re-imaging restores the state of the computer to a known, controlled state that is appropriate for support by a support organization.

2.0 Structural and Functional Overview 2.1 Example Computer Configuration

FIG. 1 illustrates computers and a data repository that can be used in detecting unauthorized access to a computer. An example computer appliance 100 generally represents any combination of computer software or hardware with different levels of access. Thus, for purposes of illustrating a clear example, the term "appliance" is used to indicate that an embodiment may involve a computer that requires relatively little user configuration prior to use and relatively little maintenance, management or configuration in use, but the approaches herein are broadly applicable to other embodiments that may use any kind of computer.

In an embodiment, appliance 100 generally represents a system with any combination of hardware or software executing an operating system 111. Examples of appliance 100 include wireless appliances, network software appliances, data center appliances, security appliances, voice and unified communications appliances, Telepresence appliances, video appliances, routers, and switches. For example, a Network Admission Control (NAC) appliance is configured to enforce security policy compliance on all devices seeking to access network computing resources. With a NAC Appliance network administrators can authenticate, authorize, evaluate, and remediate wired, wireless, and remote users and their machines prior to network access. The NAC appliance may identify whether networked devices such as laptops, IP phones, or game consoles are compliant with a network's security policies and repair any vulnerabilities before permitting access to the network.

Examples of operating system 111 for various embodiments include Linux, UNIX, UNIX derivatives, Microsoft Windows NT, and any other operating system that comprises a root shell, area or commands or functions that are protected or limited to a super user or administrator, a root-administrator access limitation, protected root-administrator filesystem area, or other storage, memory or other computer element to which ordinary user access is normally restricted. For purposes of illustrating a clear example, embodiments are described in terms of controlling root shell or root-administrator filesystem access; however, other embodiments can be used in other scenarios in which an organization wishes to identify the state of a computer or appliance. In this disclosure, the term "root-administrator" encompasses any of a super user, administrator, or root shell user. Further, the approaches herein do not require voiding a warranty or prohibiting support; instead, the approaches provide a way for an organization to identify that a user of a computer or appliance has gained full operating system access when such access is normally locked or prohibited.

In an embodiment, the appliance 100 comprises a server computer that provides services to client computers. Appliance 100 may comprise an enterprise application running on a server computer. In an embodiment, appliance 100 is configured as a peer computer in a peer-to-peer system. In an embodiment, appliance 100 may be accessible from other machines using one or more interfaces, a web portal, or other tools that provide access to appliance 100. In an embodiment, appliance 100 is accessible over a network connection by one or more users. Information or services provided by the appliance 100 may also be stored and accessed over the network connection.

In an embodiment, appliance 100 includes an interface 108, access logic 114, an appliance state 116, and a data repository 118. Each of the interface 108, access logic 114, an appliance state 116, and a data repository 118 described above may be located on the same computer device or may be located on separate devices coupled by one or more networks or internetworks including an Internet, Intranet, Extranet, Local Area Network (LAN), or Wide Area Network (WAN), using wired or wireless links. Each of the interface 108, access logic 114, an appliance state 116, and a data repository 118 may be implemented using any one or a combination of electronic digital hardware logic, firmware, or one or more computer programs or other software elements. In an embodiment, appliance 100 comprises a special-purpose computer featuring access logic 114 configured to perform certain special functions as further described herein.

In various embodiments, data repository 118 comprises a data storage device such as local digital electronic memory on appliance 100, local mass storage, storage connected to the appliance over a network, or storage that is divided into different hierarchical or mutually exclusive sections. In an embodiment, at least part of data repository 118 comprises or represents storage that is normally protected from user access, such as root-administrator locations in a filesystem managed by an operating system, other protected filesystem locations, program address space, system memory, or other protected memory locations. In an embodiment, access to the data repository 118 may be restricted or secured. For example, access to data repository 118 may require authentication using passwords, secret questions, personal identification numbers, biometrics, or any other suitable authentication mechanism. Data repository may comprise an encrypted filesystem.

Elements or various portions of data stored in the data repository 118 may be distributed and stored in multiple data repositories e.g., servers across the world. In an embodiment, the data repository 118 includes flat, hierarchical, network based, relational, dimensional, object modeled, or data files structured otherwise. For example, data repository 118 may be maintained as a table of a SQL database. In addition, data in the data repository 118 may be verified against data stored in other repositories.

In an embodiment, interface 108 is to any interface adapted for use to access the appliance 100 and any services provided by the appliance 100 directly or over a network, in accordance with one or more embodiments. The interface 108 may be a web interface, graphical user interface GUI, command line interface, or other suitable interface. The interface 108 may reside on the appliance 100 or any device that may connect to the appliance 100 such as personal computers PCs, mobile phones, personal digital assistants PDAs, or other digital computing devices of the users or may be executed remotely in conjunction with the appliance 100.

In an embodiment, an access level provided by the interface 108 determines which parts or sections among different sections of the data repository 118 are accessible. In an example involving hierarchical sections as illustrated in FIG. 1, a root-administrator access level 110 may provide access to all of the accessible data 120 within data repository 118 and limited access level 112 may provide access to a limited set of accessible data 122. Although the interface is shown with two different types of access, other embodiments may allow for any number of different access levels. Access levels provided by the interface 108 may be hierarchical, for example, a greater access level may allow for access of all data accessible by a lower access level and further, additional data not accessible by the lower access level.

In another embodiment, access levels provided the interface 108 may allow for access to mutually exclusive sets of data. For example, client data for each client may be accessible only by the particular corresponding client. For the two hierarchical access levels illustrated in the example interface 108, input or output I/O with a user may involve I/O with limited OS access 102 or I/O with root-administrator OS access 106.

In an embodiment, each interface 108 used for accessing the appliance 100 may be configured by default to provide the limited OS access level 112. The interface 108 may then receive input from a user or automated equivalent which includes a request to gain root-administrator access 104). Responsive to the request to gain root-administrator access 104, the access logic 114, which may grant or deny root-administrator OS access level 110, may be configured to immediately provide root-administrator OS access level 110, may provide root-administrator access after a successful authentication.

2.2 Access State Data and Secret Key(s)

In an embodiment, access state 116 comprises logic with stored data that indicates whether root-administrator OS access level 110 has been gained by a user or data that can be used to determine whether the root-administrator OS access level has been gained by a user. The access state 116 may be maintained by the access logic 114 based on the access level requested and provided to a user. The access state 116 may indicate whether root-administrator OS access level 110 has been gained, whether root-administrator OS access level 110 that was gained has actually been utilized, the number of times an interface shell for root-administrator OS access was utilized, the duration of the root-administrator OS access level 110, or the sections with the data repository 118 that were accessed using the root-administrator OS access level 110.

In an embodiment, access state 116 comprises a flag that indicates whether a user has gained root-administrator OS access level 110.

In an embodiment, the access state 116 comprises a secret key 117 that is stored on the appliance 100. In an embodiment, the original equipment manufacturer of the appliance or the entity providing support for the appliance creates and stores a secret key 117 in non-volatile storage such as disk storage. The location of the secret key 117 is not critical. In an embodiment, the appliance, operating system and application(s) provide no public interfaces with which a user or user application can access the secret key or a file containing the secret key.

The secret key 117 may be used to generate a warranty code or warranty verification number that is provided to a support entity, by a user of the appliance 100, for warranty-related support. In an embodiment, access logic 114 is configured to selectively generate one or more warranty codes under authorized circumstances. The warranty codes are capable of secure verification by an authorized organization, but cannot be counterfeited by a user easily. In an embodiment, when the appliance 100 initiates operation after a cold bootstrap start or warm reboot, access logic 114 automatically generates a warranty verification number based on the secret key, provided that the secret key 117 is present in the appliance. The user may display the warranty verification number using a "show version" command or other operating system operation. Example output of a "show version" command in one embodiment may comprise: ade-srv1#show version Cisco Application Deployment Engine Operating System Software ADE-OS 2120 Software Version 1.1.0.313 RELEASE SOFTWARE Copyright (c) 1986-2008 by Cisco Systems, Inc.

Base ethernet MAC Address: 00:0E:84:D5:00:C0

Model number: ADE-2120-2-1-1

Motherboard serial number: FOC07511EBX

System serial number: FOC0751X29R

Software warranty state: SUPPORTED

Software warranty verification number: 398492043

To obtain support services, a user generates a display of the warranty verification number using an appropriate command, contacts a support services organization, and provides the warranty verification number upon request by a representative of the support services organization. If the user cannot generate the warranty verification number and provide it to a representative, the user cannot obtain support, or obtains only limited support. For example, if root-administrator OS access level 110 is gained by the user, the secret key is deleted so that the warranty number can longer be generated. A lack of a warranty number may prevent the user from obtaining support for the appliance 100 in an unsupported state where the root-administrator OS has been accessed. In an embodiment, the user may access support using a World Wide Web browser to connect to a support website, and the user may be required to provide the warranty verification number in an electronic form as a condition of obtaining support information.

In an embodiment, a time value may also be used to generate the warranty number so that a warranty number generated before root-administrator OS access cannot be used to obtain support for the appliance 100 after root-administrator OS access. For example, warranty numbers may be generated using a secret key stored on the appliance 100 and a current timestamp from a system clock, so that the resulting warranty number is only be valid for a predetermined time period after generation of the warranty number. As another example, a serial number of the appliance 100 is used to generate the warranty number to prevent a consumer from obtaining support for an appliance using warranty numbers generated by other appliances.

In an embodiment, the warranty verification number is calculated by applying a crypto hash of the secret key, concatenated with the serial number, concatenated with the current time: warranty_verification_number=sha1-hash (secret_key||serial_number||current_time).

Various embodiments may use various crypto hashing algorithms and the particular algorithm is not critical to an embodiment. A suitable hash function is a one-way hash that makes deriving the secret key from the warranty verification number difficult. In an embodiment, the hashing algorithm is SHA-1.

Since the current time is used to derive the hash, the warranty verification number that is displayed to the user changes every minute for a given appliance. When the customer calls a support organization, a support engineer can ask the customer for the warranty verification number and device serial number. In an embodiment, the support engineer has access to an internal web application that can also calculate warranty verification numbers. Since the web application is internal, the application also has access to the secret key that was used on the appliance, or on the same model of the appliance. The web application runs the same hashing algorithm, using the same secret key and serial number provided by the customer. Since the warranty verification number is also time sensitive, the web application can generate warranty verification numbers for a 24 hour window, comparing each of the warranty verification numbers in the window sequentially with the warranty verification number provided by the customer. Once a match is found, the web application returns a success response to the support engineer, verifying that the warranty verification number provided was valid. The user can then obtain warranty support.

2.3 Determining Secret Key Using Challenge

In some embodiments, using a time value in determining the warranty verification number may be vulnerable to manipulation if a user or consumer is able to advance the system clock of the appliance, for example, to the first day of the next month. The user could then perform a "show version" command or the equivalent save the warranty verification number to a file. The user could repeat the process for consecutive months, resulting in several warranty verification numbers that were obtained on the first day of each month for the rest of the year. The user could then perform a "rootshell" command or the equivalent that causes the appliance to enter an unsupported state. The user could continue to use the appliance in the unsupported state and make a support call on the first day of the next month. In the support call, the user could provide the warranty verification number that was saved after advancing the clock.

In an alternate embodiment, a random challenge is used to generate the warranty verification number, the current time is not required and the following function is used: warranty_verification_number=sha1-hash (secret_key||serial_number||challenge) The support organization provides the challenge, and the access logic 114 is configured not to show the warranty verification number in response to a "show version" command. The access logic 114 is configured to receive and respond to a specified command, such as "show warranty," and to provide a prompt for the challenge in response to the command. The support representative uses the web application described above to produce the challenge, and provides the challenge to the user. The user enters the challenge using interface 108 and the warranty verification number is then displayed. The user then reads the warranty verification number to the support representative and the warranty verification number is verified with the web application. Thus, using this alternative, the warranty verification number is guaranteed to be generated and verified at the time of the support call.

2.4 Providing Access After Warning

The access logic 114 may also be configured to provide the root-administrator OS access level 110 after displaying a warning and receiving approval from the user, that gaining root-administrator access will affect the support available for the appliance 100. For example, the access logic 114 may be configured to provide a warning such that the appliance 100 will not be supported or may be in a reduced support state if root-administrator access is gained. The access logic 114 may further prompt the user to indicate whether the user would like to gain root-administrator access with the reduced or unsupported state, or if the user would like to continue using the appliance 100 with limited OS access level 112 in a fully supported state.

An example message that may be generated and displayed in response to receiving a "rootshell" command is:
ade-srv1#rootshell
\* \* \* WARNING \* \* \*
Gaining a full operating system shell will affect the status of your support agreement. If you continue, your system will be in an unsupported state. You can bring your system back to a supported state by re-imaging your system with the recovery CD. It is highly recommended that you perform a system backup before continuing. This backup may be used to restore your configuration after a re-image. Are you sure you want to continue with a root shell? (y/n)

If the user chooses "Y" to continue with root-administrator access, the secret key is deleted. Thereafter, in response to receiving a "show version" command or the equivalent, access logic 114 determines that no secret key is available, and displays "UNSUPPORTED" or an equivalent signal for the warranty state in the output of the command. The resulting system is in an unsupported state until it is re-imaged. Example output from a "show version" command of an unsupported system may comprise:
ade-srv1#show version
Cisco Application Deployment Engine Operating System Software
ADE-OS 2120 Software Version 1.1.0.313 RELEASE SOFTWARE
Copyright (c) 1986-2008 by Cisco Systems, Inc.
Base ethernet MAC Address: 00:0E:84:D5:00:C0
Model number: ADE-2120-2-1-1
Motherboard serial number: FOC07511EBX
System serial number: FOC0751X29R
Software warranty state: UNSUPPORTED
Thus, no warranty verification number is displayed when a system is in unsupported state.

2.5 Supporting Features and Options

In an embodiment, the access state 116 may be stored remotely. For example, if appliance 100 has network access, the appliance may transmit the access state 116 for storage in a data repository. In various embodiments, appliance 100 transmits the access state 116 periodically or each time there is a change in the access state 116. The access state 116 for each appliance 100 may also be directly stored at data repositories accessible to a support entity that provides support for the appliance.

In an embodiment, the operating system of the appliance 100 is secure, such that only one way to gain root-administrator access is provided, using a "rootshell" CLI command or the equivalent. In an embodiment, a user cannot gain root-administrator access by any other method, such as mounting the file-system from another system, or modifying the system bootstrap arguments. In an embodiment, repository 118 comprises an encrypted filesystem, and the operating system comprises a kernel that does not allow modifying boot-loader parameters to gain root-administrator access. In a Linux implementation, the open source projects "EncFS" and "Loop-AES" can be used to produce an encrypted filesystem.

In an embodiment, the secret key is unavailable to the user. In an embodiment, the secret key is embedded into the recovery image, for example, encrypted and not extractable from the recovery image.

Embodiments provide the benefit that the system state changes in response to a user gaining root-administrator access or using a privileged command, and the system state cannot be restored to a supported system state without re-imaging the system. As a result, a support organization or other organization associated with a device can determine if a system has granted root-administrator access since the last re-image. Further, the approach herein precludes the creation of back doors by the user. Once the user gains root-administrator access, the user cannot counterfeit the warranty verification number because the secret key used to generate the warranty verification number is deleted and is unrecoverable. Example embodiments are useful in any computer, appliance or networking device that uses an operating system having a root shell or the equivalent.

Figure 2:
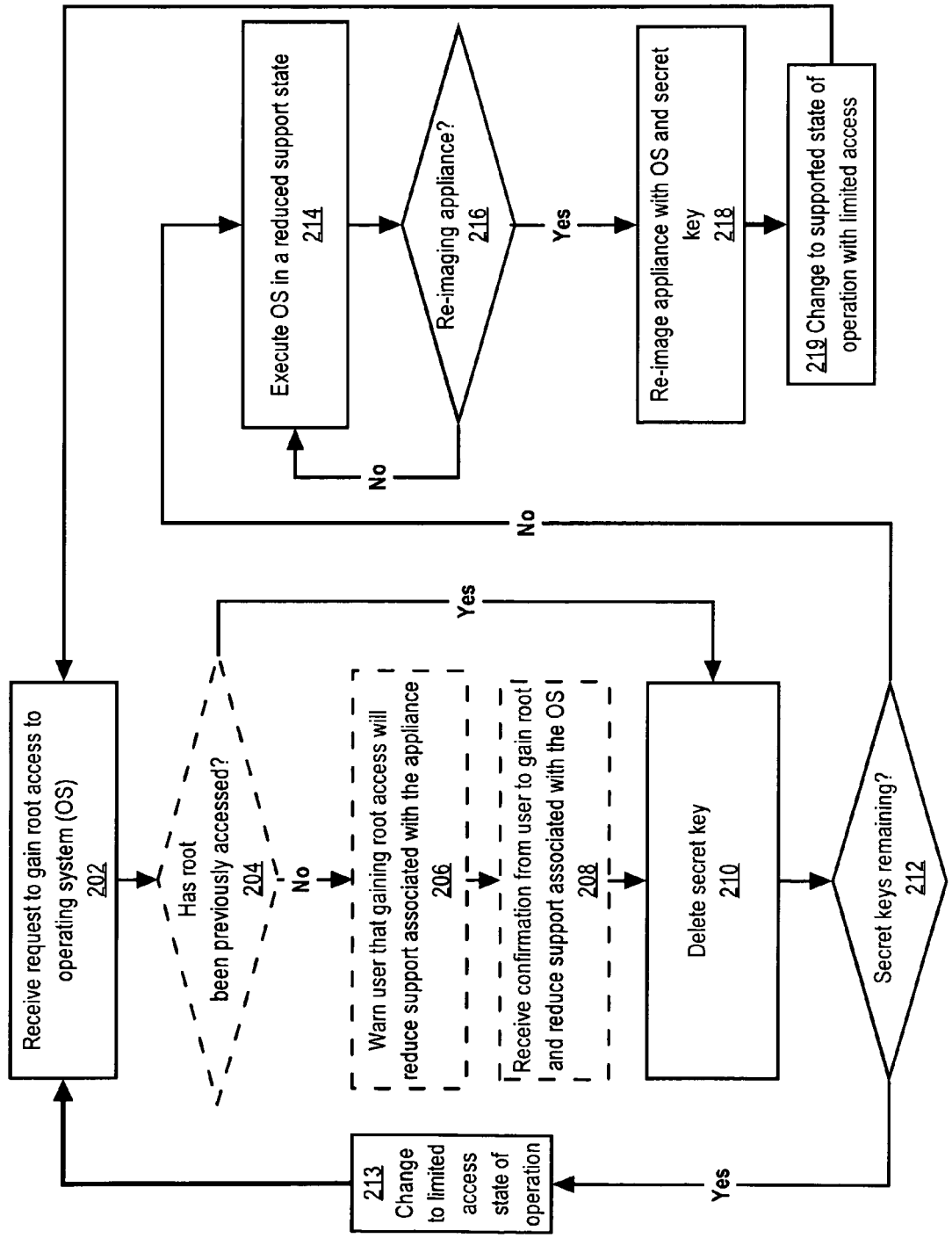
FIG. 2 illustrates a process of detecting unauthorized access to a computer.

3.0 Processes for Detecting and Controlling Access 3.1 Processing Requests for Root-Administrator Access FIG. 2 illustrates a process of detecting unauthorized access to a computer. In an embodiment, the process of FIG. 2 may be used in effect to implement a software warranty seal to ensure that a consumer of a computer or appliance cannot obtain warranty service or other services after the consumer has gained unauthorized root-administrator operating system access or performed other unauthorized operations with the computer. In an embodiment, one or more of the steps described below may be omitted, repeated, or performed in a different order. Accordingly, the specific arrangement of steps shown in FIG. 2 should not be construed as required or limiting. In an embodiment, access logic 114 is configured using digital electronic hardware, firmware, computer programs or other software elements, or a combination, to perform the functions of FIG. 2.

In an embodiment, an appliance executes an operating system providing an interface that allows limited access to a user for modification of files associated with the operating system. Thus, at the inception of FIG. 2, the computer or appliance is in a supported state, in which a user or consumer can obtain support services for the computer or appliance.

If a user wishes to access a file that is unavailable, then the user requests gaining root-administrator access to the operating system. In step 202, a request to gain root-administrator access to the operating system is received. The user may wish to gain root-administrator access in order to debug the appliance, modify the configuration of the appliance, optimize the appliance for the user's particular needs, or for any other suitable reason. The request to gain root-administrator access may be made through the interface that provides limited access, through another interface or shell that allows for root-administrator access. In an embodiment, the request to gain root-administrator access may comprise typing a command in a command line interface that makes root-administrator files available.

In optional steps 204, 206, 208, the user may be warned that the user may receive a reduction in support or other services if root-administrator access is granted. In an embodiment, at step 204 a determination is made whether root-administrator access was previously gained by a user. If root-administrator access was previously gained by the user, then the user has already received the warning and accordingly, the warning for reduced support may be skipped, so that control passes to step 210. However, if the root-administrator access has not been previously gained by the user, then at step 206 the user may be warned that gaining root-administrator access will reduce or diminish the warranty associated with the appliance or operating system executing on the appliance. Step 206 may comprise generating and displaying a warning message to the user using the interface 108, in a display unit, in a printed report, in a CLI response, or other means that are perceivable by the user.

Step 206 also may comprise generating a prompt message or other indication requesting the user to confirm that the user wishes to proceed in gaining root-administrator access. For example, in a CLI embodiment, the warning message may include prompt text. In step 208, in response to the warning, a confirmation is received from the user that the user wishes to proceed with gaining root-administrator access.

In an embodiment in which the access state 116 is implemented as a secret key stored on the appliance 100, at step 210 the secret key is deleted in response to receiving the user's confirmation to proceed with root-administrator access. When only a single secret key is provided for generating a warranty number and obtaining support for the appliance, deletion of the secret key precludes the consumer from generating a warranty number that can be provided to a support organization to obtain support. Thus, deleting the secret key in effect results in reducing or eliminating support.

In another embodiment in which multiple secret keys or multiple copies of a secret key are provided, deletion of a secret key at step 210 may or may not result in reduced support. For example, if three secret keys are stored in appliance 100, support may be reduced in part by an incremental amount each time one of the three secret keys is deleted. Alternatively, support may be reduced or eliminated after all three of the secret keys are deleted.

In embodiments using multiple secret keys, at step 212 a determination is made whether any more secret keys remain in storage in the appliance. If more secret keys remain, then the appliance 100 changes state, but continues to operate in a limited access state after expiration or termination of the root-administrator access for the operating system, as indicated at step 213.

However, if only a single secret key is used, or if each of the multiple keys are deleted, then the appliance or its operating system executes in a reduced support state at step 214. In the reduced support state, warranty-related support for the appliance may be limited or eliminated.

In an embodiment, execution of the appliance or operating system in the reduced support state continues as long as the appliance is not re-imaged, as tested at step 216. In an embodiment, re-imaging the appliance at step 218 causes the appliance to return the supported state with limited access, as shown in step 219.

In this context, re-imaging refers to copying an operating system and one or more application programs into non-volatile storage of the appliance, completely replacing any prior operating system, application programs, and other information in the non-volatile storage. Re-imaging the appliance may involve copying or "ghosting" a supported version of the operating system onto the appliance or reformatting the appliance with an altogether new installation of the operating system onto the appliance.

In an embodiment, partial re-imaging may be used to return the appliance to a supported state. For example, only files or partitions on the appliance that have been accessed using the root-administrator OS access level 110 may be re-imaged, and the access state 116 may be changed concurrently to return the appliance 100 to the supported state. For example, changing access state 116 may comprise writing one or more new secret keys onto the appliance. In another example, in which the access state of the appliance is stored remotely, the access state 116 may be updated upon re-imaging to indicate a supported state and a limited access state.

3.2 Changes is Appliance State—Single Key

Figure 3A:
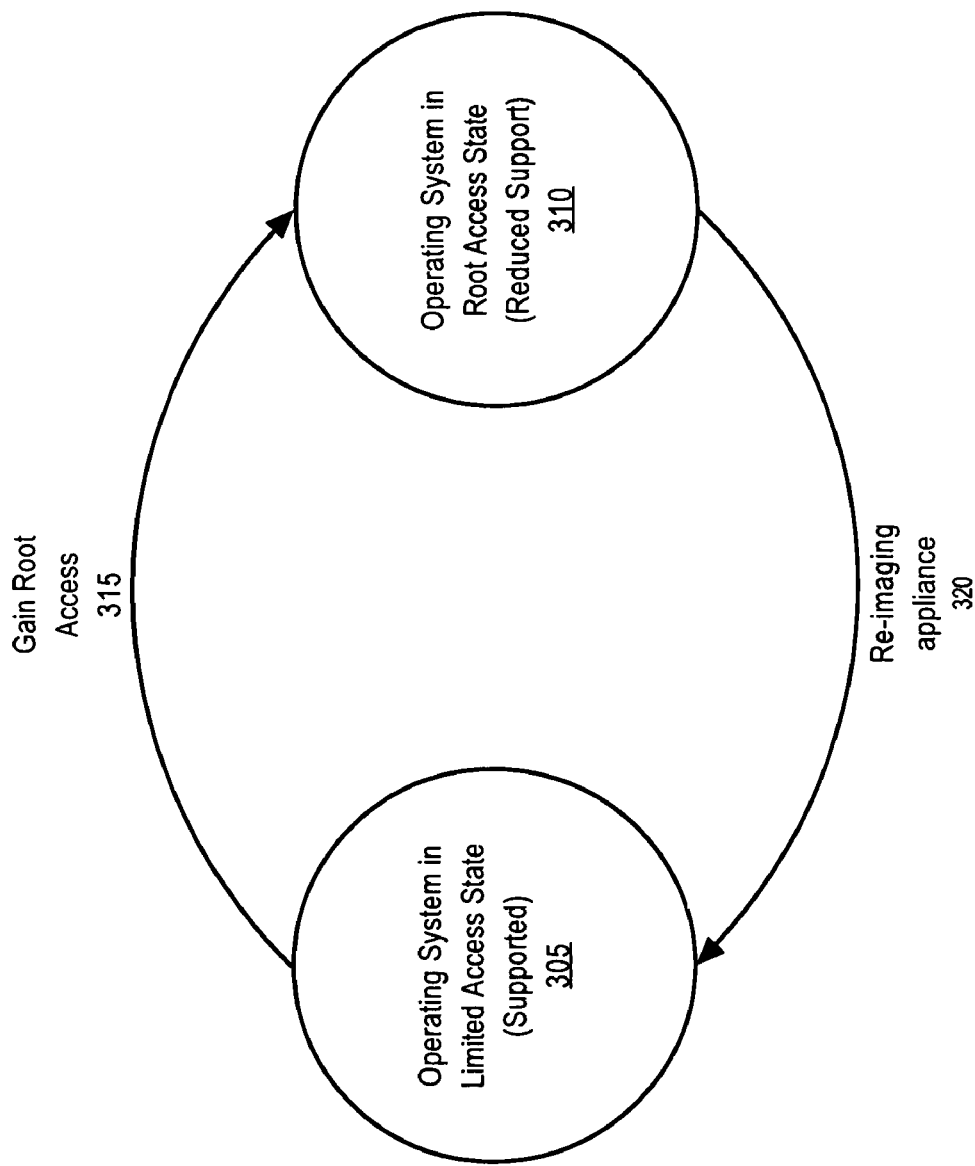
FIG. 3A illustrates two states of a computer.
Figure 3B:
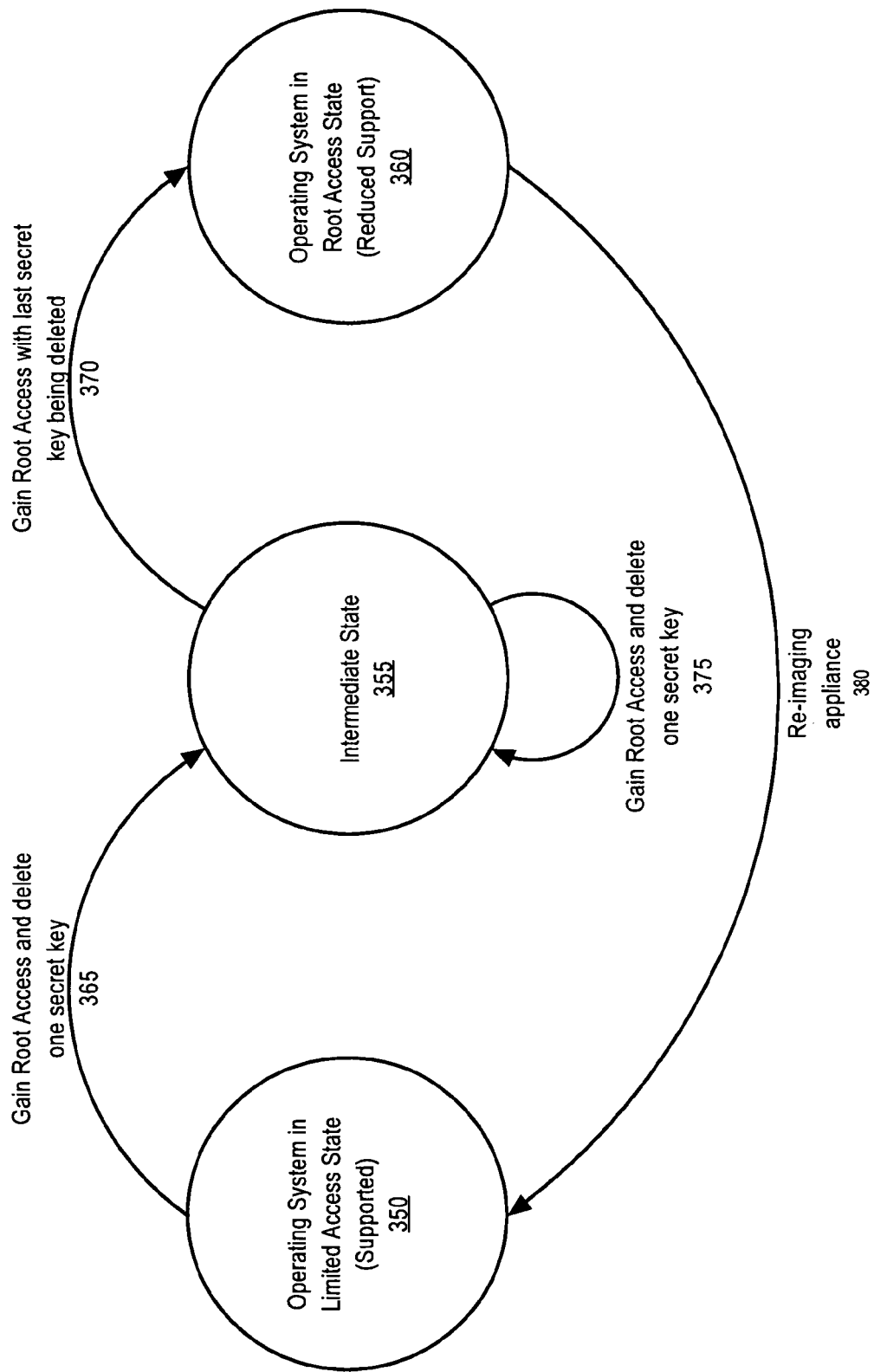
FIG. 3B illustrates states of a computer using multiple keys.

The process of FIG. 2 may be understood more completely with reference to FIG. 3A, FIG. 3B. FIG. 3A illustrates two states of a computer. FIG. 3B illustrates states of a computer using multiple keys.

Referring first to FIG. 3A, initially an appliance or operating system executes in a limited access state 305. The limited access state 305 is fully supported based on the warranty associated with the appliance. Accordingly, when an error occurs in the limited access state 305, a user may contact a support entity for debugging the appliance.

However, when a request to gain root-administrator access is received and granted as indicated by state transition 315, the appliance or operating system changes to a root-administrator access state 310. The root-administrator access state 310 allows for accessibility to operating system files in root-administrator filesystem locations. However, the root-administrator access state 310 causes a reduced support state in comparison to the limited access state 305. The reduced support state generally represents operation of the appliance in an entirely unsupported state or in a reduced support state as compared with the supported state 305.

In an embodiment, re-imaging the appliance in the reduced support state, as indicated by state transition 320, returns the appliance to the supported state 305.

3.3 Changes in Appliance State—Multiple Keys

Referring now to FIG. 3B, in an embodiment using multiple keys, a limited access state 350 and root-administrator access state 360 correspond to limited access state 305 and the root-administrator access state 310 of FIG. 3A. An intermediate state 355 is defined and is reached from the supported state 350 when one secret key is deleted responsive to root-administrator access by a user, as shown by state transition 365. Furthermore, in the intermediate state 355, a secret key is deleted each time root-administrator access is gained again, as shown by state transition 375. For example, a secret key may be deleted for each session initiated by the user in which root-administrator access is gained.

The appliance is maintained in the intermediate state 355 as long as at least one secret key remains on the appliance. In various embodiments, the intermediate state 355 may cause the appliance to be supported as in supported state 350, or the reduced support state 360 or in an intermediate level of support between the supported state 350 and the reduced support state 360.

In state transition 370, gaining root-administrator access by the user results in deletion of the last secret key. As a result, the appliance transitions to the reduced support state 360.

4.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
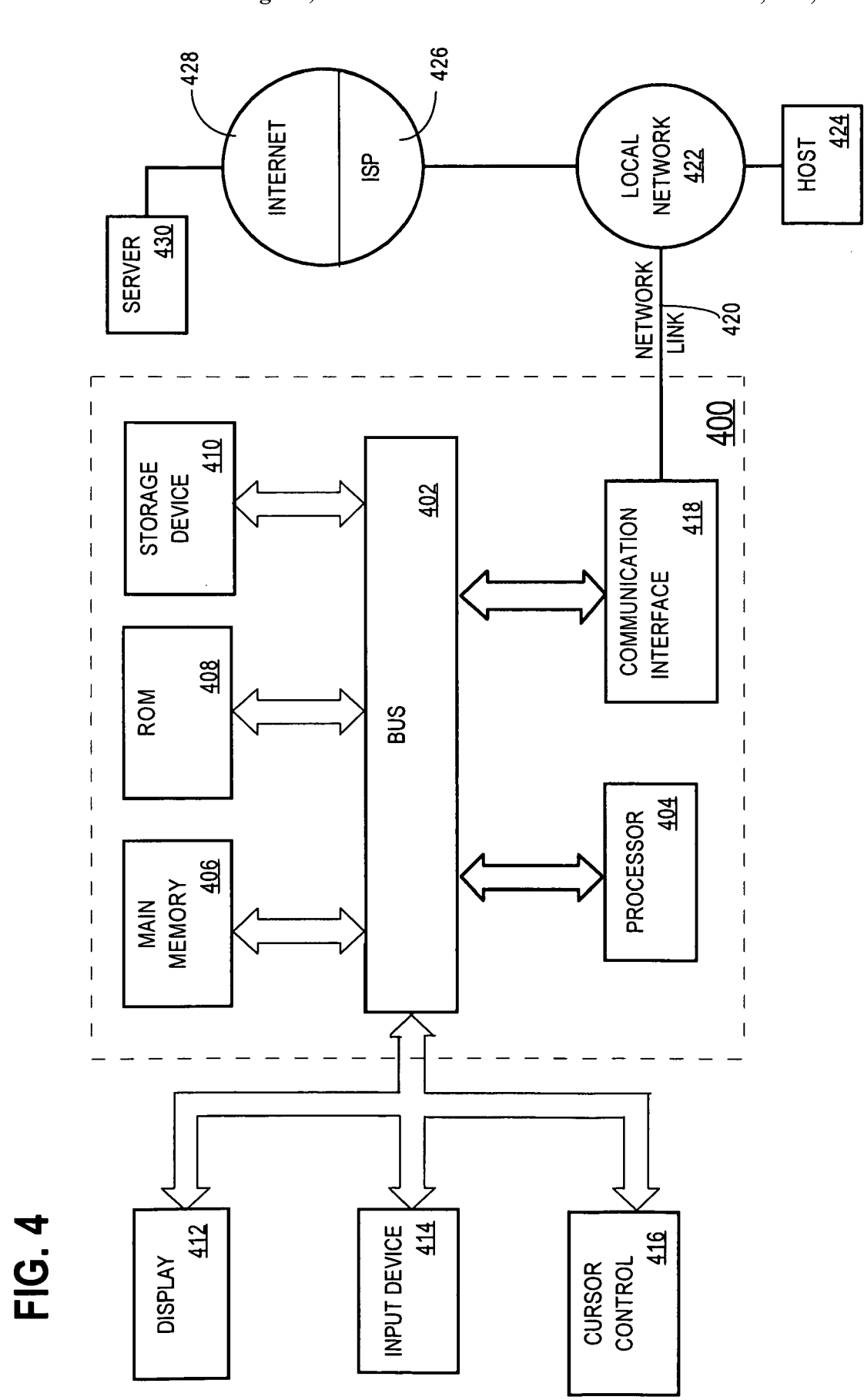
FIG. 4 illustrates a computer system that may be used in implementing an embodiment.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine executed method comprising:
    at a first computer, receiving from a second computer a request to gain root-administrator access to an operating system (OS) of the first computer;
    the first computer, in response to receiving the request to gain root-administrator access, granting the root-administrator access and modifying stored access state data from a first state associated with the OS to a second state associated with the OS, wherein the second state is different than the first state and the second state indicates that root-administrator access to the OS was granted;
    after the root-administrator access is terminated, maintaining the stored access state data in the second state to continue to indicate that root-administrator access to the OS was granted.

2. The method of claim 1, wherein the second state is associated with a lesser amount of technical support services than the first state.

3. The method of claim 1, wherein the state data originally comprises a secret key value, and wherein modifying the state data comprises deleting the secret key value.

4. The method of claim 1, wherein the state data originally comprises a secret key value, and further comprising the first computer generating and displaying a warranty verification number on a display device that is coupled to the first computer, wherein the generating comprises one-way hash logic in the first computer processing at least the secret key, a current time, and a serial number associated with the first computer.

5. The method of claim 1, wherein the state data originally comprises a secret key value, and further comprising the first computer receiving a challenge value, and generating and displaying a warranty verification number on a display device that is coupled to the first computer, wherein the generating comprises one-way hash logic in the first computer processing at least the secret key, the challenge value, and a serial number associated with the first computer.

6. The method of claim 1, further comprising re-imaging the OS and changing the stored state value to the first state associated with the OS.

7. The method of claim 1, further comprising, in response to receiving the request to gain root-administrator access, displaying on a display device coupled to the first computer, a warning message indicating that gaining root-administrator access will reduce support for the OS, and receiving user input indicating confirmation to accept reduced support and gain root-administrator access.

8. The method of claim 1, wherein the state data comprises a secret key value, and further comprising generating a first warranty verification number for the first computer based on the secret key value, wherein the first warranty verification number is valid for a specified time after the generating; in response to receiving the request to gain root-administrator access to the operating system (OS), deleting the secret key value and granting the root-administrator access of the OS.

9. The method of claim 1, wherein the state data comprises at least a first secret key value and a second secret key value, and further comprising:
    the first computer, in response to receiving the request to gain root-administrator access, granting the root-administrator access, deleting the first secret key value, and modifying stored state data from a first state associated with the OS to a third state associated with the OS, wherein the third state is different than the first state and the third state indicates that root-administrator access to the OS was granted;
    the first computer receiving a second request to gain root-administrator access;
    the first computer, in response to receiving the second request to gain root-administrator access, granting the root-administrator access, deleting the second secret key value, and modifying stored state data from a first state associated with the OS to the second state associated with the OS, wherein the second state indicates that root-administrator access to the OS was granted.

10. A computer comprising:
    operating system logic comprising a command interface that provides one command configured to process requests to obtain root-administrator shell access, and an encrypted filesystem;
    access state data stored in the encrypted filesystem;
    access logic coupled to the operating system logic and coupled to the access state data, wherein the access logic is configured upon execution to cause the computer to perform:
        receiving from a second computer a request to gain root-administrator access to the operating system logic of the first computer;
        in response to receiving the request to gain root-administrator access, granting the root-administrator access and modifying stored access state data from a first state associated with the operating system logic to a second state associated with the operating system logic, wherein the second state is different than the first state and the second state indicates that root-administrator access to the operating system logic was granted;

after the root-administrator access is terminated, maintaining the stored access state data in the second state to continue to indicate that root-administrator access to the OS was granted.

11. The computer of claim 10, wherein the state data originally comprises a secret key value, and wherein the access logic is configured to modify the state data by deleting the secret key value.

12. The computer of claim 10, wherein the state data originally comprises a secret key value, and wherein the access logic is further configured to cause the first computer generating and displaying a warranty verification number on a display device that is coupled to the first computer, wherein the generating comprises one-way hash logic in the first computer processing at least the secret key, a current time, and a serial number associated with the first computer.

13. The computer of claim 10, wherein the state data originally comprises a secret key value, and wherein the access logic is further configured to cause the first computer receiving a challenge value, and generating and displaying a warranty verification number on a display device that is coupled to the first computer, wherein the generating comprises one-way hash logic in the first computer processing at least the secret key, the challenge value, and a serial number associated with the first computer.

14. The computer of claim 10, wherein the access logic is further configured to cause re-imaging the operating system logic and changing the stored state value to the first state associated with the operating system logic.

15. The computer of claim 10, wherein the access logic is further configured to cause, in response to receiving the request to gain root-administrator access, displaying on a display device coupled to the first computer, a warning message indicating that gaining root-administrator access will reduce support for the OS, and receiving user input indicating confirmation to accept reduced support and gain root-administrator access.

16. The computer of claim 1, wherein the state data comprises a secret key value, and wherein the access logic is further configured to cause generating a first warranty verification number for the first computer based on the secret key value, wherein the first warranty verification number is valid for a specified time after the generating; in response to receiving the request to gain root-administrator access to the operating system (OS), deleting the secret key value and granting the root-administrator access of the OS.

17. The computer of claim 1, wherein the state data comprises at least a first secret key value and a second secret key value, and wherein the access logic is further configured to cause:

the first computer, in response to receiving the request to gain root-administrator access, granting the root-administrator access, deleting the first secret key value, and modifying stored state data from a first state associated with the OS to a third state associated with the OS, wherein the third state is different than the first state and the third state indicates that root-administrator access to the OS was granted;

the first computer receiving a second request to gain root-administrator access;

the first computer, in response to receiving the second request to gain root-administrator access, granting the root-administrator access, deleting the second secret key value, and modifying stored state data from a first state associated with the OS to the second state associated with the OS, wherein the second state indicates that root-administrator access to the OS was granted.

18. A non-transitory computer-readable storage medium comprising one or more sequences of instructions which when executed cause one or more processors to perform:

at a first computer, receiving from a second computer a request to gain root-administrator access to an operating system (OS) of the first computer;

the first computer, in response to receiving the request to gain root-administrator access, granting the root-administrator access and modifying stored access state data from a first state associated with the OS to a second state associated with the OS, wherein the second state is different than the first state and the second state indicates that root-administrator access to the OS was granted;

after the root-administrator access is terminated, maintaining the stored access state data in the second state to continue to indicate that root-administrator access to the OS was granted.

19. The non-transitory computer-readable storage medium of claim 18, wherein the state data originally comprises a secret key value, and further comprising instructions which when executed cause the first computer receiving a challenge value, and generating and displaying a warranty verification number on a display device that is coupled to the first computer, wherein the generating comprises one-way hash logic in the first computer processing at least the secret key, the challenge value, and a serial number associated with the first computer.

20. The non-transitory computer-readable storage medium of claim 18, wherein the state data comprises at least a first secret key value and a second secret key value, and further comprising instructions which when executed cause:

the first computer, in response to receiving the request to gain root-administrator access, granting the root-administrator access, deleting the first secret key value, and modifying stored state data from a first state associated with the OS to a third state associated with the OS, wherein the third state is different than the first state and the third state indicates that root-administrator access to the OS was granted;

the first computer receiving a second request to gain root-administrator access;

the first computer, in response to receiving the second request to gain root-administrator access, granting the root-administrator access, deleting the second secret key value, and modifying stored state data from a first state associated with the OS to the second state associated with the OS, wherein the second state indicates that root-administrator access to the OS was granted.

21. A method comprising:

at a first computer, receiving from a second computer a request to gain root-administrator access to an operating system (OS) of the first computer;

the first computer, in response to receiving the request to gain root-administrator access, granting the root-administrator access and modifying stored access state data from a first state associated with the OS to a second state associated with the OS, wherein the second state is different than the first state and the second state indicates that root-administrator access to the OS was granted;

after the root-administrator access is terminated, maintaining the stored access state data in the second state to continue to indicate that root-administrator access to the OS was granted;

wherein the state data originally comprises a secret key value;

requesting support services;

receiving a request to provide a valid warranty verification number in consideration for receiving the support services;

the first computer generating and displaying a warranty verification number on a display device that is coupled to the first computer, wherein the generating comprises one-way hash logic in the first computer processing at least the secret key, a current time, and a serial number associated with the first computer;

providing the warranty verification number to a support services representative;

a third computer associated with the support services generating and displaying a plurality of second warranty verification numbers by one-way hash logic in the third computer processing at least the secret key, a plurality of times that include the current time, and the serial number associated with the first computer;

the support services determining whether one of the second warranty verification numbers matches the warranty verification number and providing the support services only when one of the second warranty verification numbers matches.

22. The method of claim 21, wherein the state data originally comprises a secret key value, and further comprising the first computer receiving a challenge value, and generating and displaying the warranty verification number by the one-way hash logic in the first computer processing at least the secret key, the challenge value, and a serial number associated with the first computer.

* * * * *